(12) United States Patent
Murata et al.

(10) Patent No.: US 9,422,973 B2
(45) Date of Patent: Aug. 23, 2016

(54) BALL JOINT

(71) Applicant: THK CO., LTD., Tokyo (JP)

(72) Inventors: Tomozumi Murata, Tokyo (JP); Satoshi Kashiwagura, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 14/892,293

(22) PCT Filed: May 13, 2014

(86) PCT No.: PCT/JP2014/062674
§ 371 (c)(1),
(2) Date: Nov. 19, 2015

(87) PCT Pub. No.: WO2014/192533
PCT Pub. Date: Dec. 4, 2014

(65) Prior Publication Data
US 2016/0097421 A1    Apr. 7, 2016

(30) Foreign Application Priority Data
May 29, 2013    (JP) .................................. 2013-112963

(51) Int. Cl.
*F16C 11/06* (2006.01)

(52) U.S. Cl.
CPC ........ *F16C 11/0623* (2013.01); *F16C 11/0633* (2013.01); *F16C 11/0685* (2013.01); *F16C 11/0695* (2013.01)

(58) Field of Classification Search
CPC ............ F16C 11/0663; F16C 11/0604; F16C 11/0619; F16C 11/0671; F16C 11/0623; F16C 11/0657; F16C 11/0642; F16C 11/0695; F16C 11/0685; B62C 7/20; B60G 7/001; B60G 7/005; B60G 2204/416; Y10T 403/32729; Y10T 403/32361; Y10T 403/32786; Y10T 403/32795; Y10T 29/49659

See application file for complete search history.

(56) References Cited

U.S. PATENT DOCUMENTS 1,537,330 A * 5/1925 Buckendale ............. B62D 7/20
                                                      280/93.502
1,828,891 A * 10/1931 Crawford ............ F16C 11/0619
                                                      403/135

(Continued)

FOREIGN PATENT DOCUMENTS

JP        58-186127 U    12/1983
JP        60-170240 U    11/1985

(Continued)

OTHER PUBLICATIONS

International Search Report dated Jul. 22, 2014, issued in counterpart application No. PCT/JP2014/062674 (2 pages).

*Primary Examiner* — Daniel Wiley
(74) *Attorney, Agent, or Firm* — Westerman, Hattori, Daniels & Adrian, LLP

(57) ABSTRACT

Provided is a ball joint capable of coupling a third mechanical element in a freely pivotable manner near a pivot center of a first mechanical element and a second mechanical element coupled to each other in a freely pivotable manner. The ball joint includes: a ball stud including: a shaft member configured to allow a first mechanical element to be coupled thereto; and a ball portion formed at a distal end of the shaft member; a holder including a fixing port ion configured to allow a second mechanical element to be coupled thereto, the holder being formed through casting with the ball portion being set as a core to cover a maximum diameter portion of the ball portion, the holder being configured to couple the first mechanical element and the second mechanical element in a freely pivotable manner with the ball portion defining a pivot center; and a pivot shaft that protrudes out of the holder in a direction of intersecting with the shaft member of the ball stud to define a second pivot center independently of the ball portion, and to serve as a coupling portion for a third mechanical element, the pivot shaft being integrated with the holder at the time of the casting of the holder.

3 Claims, 5 Drawing Sheets

(56) References Cited

U.S. PATENT DOCUMENTS

| | | | | |
|---|---|---|---|---|
| 1,983,947 A * | 12/1934 | Rockwell | B62D 7/16 | 105/22 |
| 2,340,300 A * | 2/1944 | Booth | B62D 7/20 | 403/46 |
| 2,734,760 A * | 2/1956 | Marquis | A01B 69/00 | 403/56 |
| 3,374,268 A * | 3/1968 | Groves | B60D 1/065 | 280/512 |
| 3,938,822 A * | 2/1976 | Guerriero | B60G 21/0551 | 280/86.758 |
| 4,614,451 A * | 9/1986 | Braisted, Jr. | F16B 7/06 | 403/14 |
| 4,657,424 A * | 4/1987 | Dong | B62D 7/20 | 403/46 |
| 4,714,262 A * | 12/1987 | Wood | B60G 7/003 | 280/86.758 |
| 4,890,949 A * | 1/1990 | Wood, Jr. | B62D 7/18 | 403/140 |
| 4,953,894 A * | 9/1990 | Broszat | B60G 7/005 | 280/86.755 |
| 4,979,844 A * | 12/1990 | Teramachi | F16C 11/0604 | 384/489 |
| 5,059,053 A * | 10/1991 | Rose | B62D 7/20 | 403/24 |
| 5,070,609 A * | 12/1991 | Teramachi | F16C 11/0604 | 29/434 |
| 5,133,572 A * | 7/1992 | Polito | B60D 1/586 | 280/511 |
| 5,306,095 A * | 4/1994 | Snitgen | B62D 7/20 | 24/20 S |
| 5,603,583 A * | 2/1997 | Jackson | B60G 7/005 | 280/93.51 |
| 5,795,092 A * | 8/1998 | Jaworski | B60G 7/003 | 403/133 |
| 6,273,631 B1 * | 8/2001 | Takahashi | F16C 7/06 | 403/104 |
| 6,604,887 B2 * | 8/2003 | Carreira | B62D 17/00 | 403/371 |
| 6,615,900 B2 * | 9/2003 | Takahashi | B60G 7/005 | 164/108 |
| 7,357,589 B2 * | 4/2008 | Mouro | B62D 17/00 | 403/234 |
| 2003/0103087 A1 | 6/2003 | Hatakeyama | | |

FOREIGN PATENT DOCUMENTS

| | | |
|---|---|---|
| JP | 2003-167664 A | 6/2003 |
| JP | 2010-76459 A | 4/2010 |
| JP | 2011-225065 A | 11/2011 |

* cited by examiner

BALL JOINT

TECHNICAL FIELD

The present invention relates to a ball joint to be used in various link devices such as link motion mechanisms for industrial robots.

BACKGROUND ART

The ball joint disclosed in Patent Literature 1 has been known as an example of the ball joints of this type. The ball joint disclosed in Patent Literature 1 includes a ball stud including a ball portion formed at a distal end of a shaft member to define a pivot center of a link mechanism, and a holder covering a maximum diameter portion of the ball portion of the ball stud in sliding contact with a spherical surface of the ball portion.

A mechanical element such as a link member is coupled to the shaft member of the ball stud, whereas the holder includes a fixing portion configured to allow another mechanical element to be coupled thereto. Specifically, in many cases, such ball joints are used to couple the two mechanical elements to each other in a freely pivotable manner, and to define a pivot center thereof, thereby constructing link devices such as a parallel link with those mechanical elements.

CITATION LIST

Patent Literature

[PTL 1] JP 2011-225065 A

DISCLOSURE OF THE INVENTION

Problems to be Solved by the Invention

Such related-art ball joints couple the two mechanical elements and define the single pivot center therebetween. However, depending on the configuration of the link devices, it may be desired to couple a third mechanical element in a freely pivotable manner to the two mechanical elements that are coupled to each other with the ball joint, and to define a pivot center of the third mechanical element near the ball portion of the ball joint.

The related-art ball joints do not include a coupling portion for the third mechanical element, and hence the third mechanical element needs to be coupled to one of the other mechanical elements that are coupled directly to the ball joint. Thus, the pivot center of the third mechanical element needs to be defined at a position away from the pivot center of the ball joint. As a result, a degree of freedom in design of the link devices is restricted.

Further, it is also conceivable to machine the fixing portion of the holder of the ball joint to form the coupling portion for the third mechanical element. However, in that case, drilling into the holder and a process of, for example, driving a pin serving as the coupling portion into the hole formed through the drilling need to be performed. As a result, the number of work man-hours for assembly of the link device is increased, which may increase the manufacturing cost.

Means for Solving the Problems

The present invention has been made to solve the problems as described above, and has an object to provide a ball joint manufacturable at low cost, which is capable of coupling a third mechanical element in a freely pivotable manner near a pivot center of a first mechanical element and a second mechanical element coupled to each other in a freely pivotable manner.

In order to achieve the above-mentioned object, according to one embodiment of the present invention, there is provided a ball joint, including: a ball stud including: a shaft member configured to allow a first mechanical element to be coupled thereto; and a ball portion formed at a distal end of the shaft member; a holder formed through casting with the ball portion being set as a core to cover a maximum diameter portion of the ball portion, the holder including a fixing portion configured to allow a second mechanical element to be coupled thereto, the holder being configured to couple the first mechanical element and the second mechanical element in a freely pivotable manner with the ball portion defining a pivot center; and a pivot shaft that protrudes out of the holder in a direction of intersecting with the shaft member of the ball stud to define a second pivot center independently of the ball portion, and to serve as a coupling portion for a third mechanical element, the pivot shaft being integrated with the holder at the time of the casting of the holder.

Effects of the Invention

In the ball joint of the one embodiment of the present invention, the holder is formed through casting with the ball portion of the ball stud being set as a core. At the time of the casting, the holder and the pivot shaft are integrated with each other. The pivot shaft protrudes out of the holder in the direction of intersecting with the shaft member of the ball stud to serve as the coupling portion for the third mechanical element, and to define the second pivot center independently of the ball portion. Thus, through use of the ball joint of the one embodiment of the present invention, the third mechanical element can be easily coupled in a freely pivotable manner near the pivot center of the first mechanical element and the second mechanical element. In addition, at the time of the casting of the holder, the pivot shaft is embedded in and fixed to the holder. With this, the second pivot center can be added to existing ball joints at low cost.

MODE FOR CARRYING OUT THE INVENTION

Now, with reference to the accompanying drawings, detailed description is made of the ball joint of the present invention.

Figure 1:
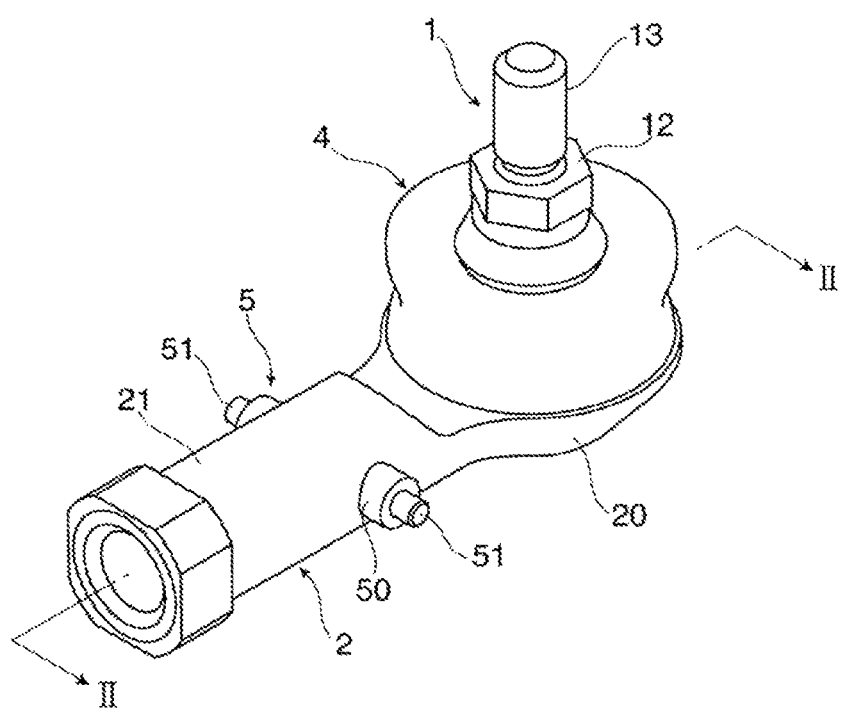
FIG. 1 is a perspective view for illustrating a ball joint according to an exemplary embodiment, to which the present invention is applied.
Figure 2:
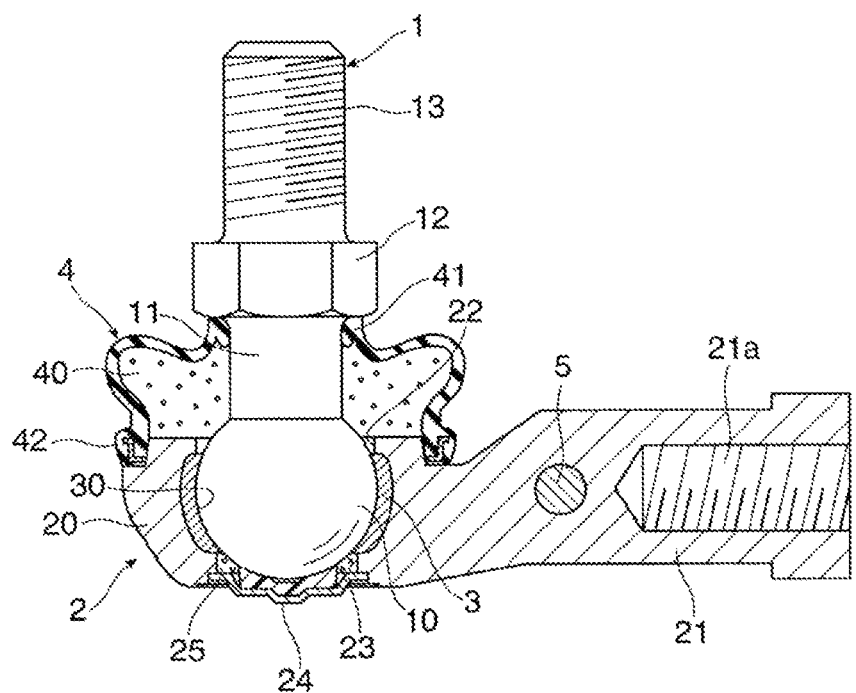
FIG. 2 is a sectional view taken along the line II-II, for illustrating the ball joint illustrated in FIG. 1.

FIG. 1 and FIG. 2 are views for illustrating a ball joint according to an exemplary embodiment, to which the present invention is applied. FIG. 1 is a perspective view for illustrating an external appearance, and FIG. 2 is a sectional view taken along the line II-II in FIG. 1. The ball joint includes a ball stud 1 including a ball portion 10 formed at a distal end of a shaft member 11, a resin sliding contact member 3 covering the ball portion 10 in sliding contact with the ball portion 10, a holder 2 configured to hold the resin sliding contact member, a boot seal 4 covering a portion between the shaft member 11 of the ball stud 1 and the holder 2, and a pivot shaft 5 having both ends protruding out of the holder 2.

The ball stud 1 is coupled to the holder 2 in a freely pivotable manner, and the ball portion 10 of the ball stud 1 defines a pivot center of the ball stud 1. Thus, when a first mechanical element and a second mechanical element are fixed respectively to the ball stud 1 and the holder 2, those mechanical elements can be coupled to each other in a freely pivotable manner with the ball portion 10 defining the pivot center. Further, the pivot shaft 5 can be used for coupling a third mechanical element. With this, the holder and the third mechanical element can be coupled to each other in a freely pivotable manner with the pivot shaft 5 defining a second pivot center.

The ball stud 1 is formed, for example, through electric resistance welding of the shaft member 11 having a bar shape to a high-sphericity bearing steel ball being the ball portion 10. Alternatively, an integral piece of the ball portion 10 and the shaft member 11 may be formed into the ball stud through plastic working such as cold forging. A flange portion 12 having a bearing surface configured to allow the first mechanical element such as a link member to be fixed thereto is formed on the shaft member 11, and male threads 13 are formed on a side opposite to the ball portion 10 with respect to the flange portion 12. Further, the flange portion 12 is formed into a shape of a hexagonal nut so that the male threads 13 of the ball stud 1 can be fastened to the first mechanical element with a spanner wrench.

The resin sliding contact member 3 is formed into an annular shape covering a maximum diameter portion of the ball portion 10, specifically, covering substantially ⅔ of a spherical surface of the ball portion 10. More specifically, two opening portions are formed through the resin sliding contact member 3 in directions opposite to each other, and the spherical surface of the ball portion 10 protrudes through those opening portions. An inner peripheral surface of the resin sliding contact member 3 includes a concave resin sliding contact surface 30 that substantially conforms to the spherical surface of the ball portion 10. Under a state in which the resin sliding contact member 3 is fixed to the holder 2, the spherical surface of the ball portion 10 and the resin sliding contact surface 30 are held in sliding contact with each other. With this, the ball stud 1 can be pivoted with respect to the holder 2. As an example of materials of the resin sliding contact member 3, there may be used polyether ether ketone (produced by Victrex plc., trade name "PEEK"), which has a thickness of, for example, approximately 1.0 mm.

Meanwhile, the holder 2 includes a body portion 20 formed so as to surround the resin sliding contact member 3, and a fixing portion 21 configured to couple the body portion 20 to the second mechanical element such as a link member. The body portion 20 and the fixing portion 21 are formed integrally with each other through die casting of an aluminum alloy or a zinc alloy. Female threads 21a are formed in the fixing portion 21 to allow male threads formed in the second mechanical element to be coupled thereto.

The body portion 20 of the holder 2 is formed into an annular shape on an outside of the resin sliding contact member 3, and the resin sliding contact member 3 is fixed to the body portion 20. In the body portion 20, two opening portions 22 and 23 are formed so as to correspond to the pair of opening portions of the resin sliding contact member 3. The opening portion 22 on one side defines a pivot range of the ball stud 1, whereas the opening portion 23 on another side is closed by a closure cap 24. The body portion 20 is kept out of contact with the ball portion 10 of the ball stud 1. Between the body portion 20 and the ball portion 10, the resin sliding contact member 3 is slightly exposed in both the opening portions 22 and 23. Note that, the opening portion 23 of the holder 2 is closed by the closure cap 24, and a grease pool 25 is formed in the opening portion 23.

Figure 3:
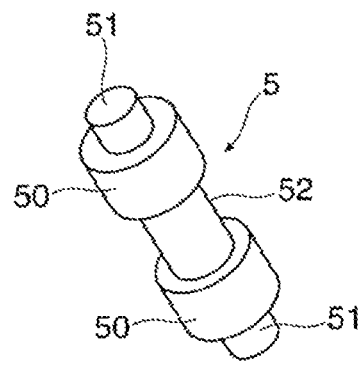
FIG. 3 is a perspective view for illustrating an example of a pivot shaft.

Further, the pivot shaft 5 is a columnar member formed through cutting or forging, and extends through the fixing portion of the holder 2. A longitudinal central portion of the pivot shaft 5 is embedded in and fixed to the fixing portion 21 of the holder 2 at the time of the die casting of the holder 2. With this, the pivot shaft 5 is integrated with the holder 2. FIG. 3 is a perspective view for illustrating the pivot shaft 5. The pivot shaft 5 includes a fixing shaft portion 50, and a pair of distal shaft portions 51 protruding from both axial ends of the fixing shaft portion 50. As understood from FIG. 1, both the axial ends of the fixing shaft portion 50 slightly protrude out of the fixing portion 21 of the holder 2, and the distal shaft portions 51 fully protrude out of the holder 2. A central axis of the pivot shaft 5 extends in a direction perpendicular to a central axis of the ball stud 1 under a state in which the ball stud 1 is raised at a center in the pivotable range thereof, that is, a center of the opening portion 22 of the holder 2. Further, a distance between the central axis of the pivot shaft 5 and a center of the ball portion of the ball stud 1 may be arbitrarily set.

An outer diameter of each of the distal shaft portions 51 is set smaller than an outer diameter of the fixing shaft portion 50, and a tolerance of the outer diameter is set in consideration of fitting in accordance with inner diameters of commercially available rotation bearings. Further, axes of the pair of distal shaft portions 51 protruding to both sides of the holder 2 are coaxial with each other. In addition, an engaging groove 52 is formed at an axial center of the fixing shaft portion 50. The engaging groove 52 is configured to be embedded in the fixing portion 21 of the holder 2 formed through the die casting as described above. In other words, the engaging groove 52 thus formed prevents the pivot shaft 5 from being pulled out of the fixing portion 21 of the holder 2 in an axial direction. In this way, the pivot shaft 5 is firmly fixed to the fixing portion 21.

Further, the boot seal 4 is mounted between an outer rim of the body portion 20 of the holder 2 and the shaft member 11 of the ball stud 1 to prevent entry of, for example, dust and foreign matter into gaps between the ball portion 10 of the ball stud 1 and the body portion 20 of the holder 2, and to form a seal pocket 40 configured to contain a lubricant such as grease. Note that, an end portion 41 of the boot seal 4 on the ball stud 1 side has elasticity enough to be held in close contact with the shaft member 11, whereas an end portion 42 of the boot seal 4 on the holder 2 side is nipped between an engaging ring and the outer rim of the holder 2. With this, the boot seal 4 is not disengaged even by pivot motions of the ball stud 1.

Figure 4:
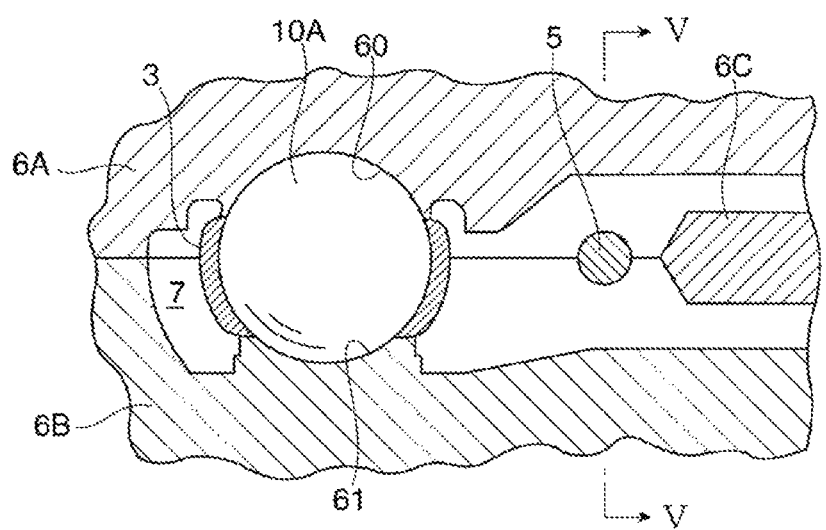
FIG. 4 is a sectional view for illustrating an example of die casting of a holder of the ball joint illustrated in FIG. 1.

FIG. 4 is a sectional view for illustrating a step of the die casting of the holder, specifically, illustrating a state in which a bearing steel ball 10A being the ball portion 10 of the ball stud 1, the resin sliding contact member 3, and the pivot shaft 5 are set as cores in casting dies 6A, 6B, and 6C.

The resin sliding contact member 3 is mounted to the bearing steel ball 10A in advance. The bearing steel ball 10A may be covered with the resin sliding contact member 3, for example, by forming the resin sliding contact member 3 and mounting the resin sliding contact member 3 to the bearing steel ball 10A in a single step through injection molding of the resin sliding contact member 3 with the bearing steel ball 10A being set as the core. When the resin sliding contact member 3 is formed with the bearing steel ball 10A itself being set as a core in this way, time and effort in mounting the resin sliding contact member 3 to the bearing steel ball 10A can be omitted. In addition, a spherical surface of the bearing steel ball 10A is transferred onto the resin sliding contact surface 30 of the resin sliding contact member 3, and hence the resin sliding contact member 3 and the bearing steel ball 10A are held in surface contact with each other without gaps. With this, the ball portion 10 of the ball stud and the resin sliding contact member 3 can be mutually maintained in a satisfactory sliding contact state later.

Note that, as a matter of course, the resin sliding contact member may be formed independently of the bearing steel ball, and the resin sliding contact member 3 thus formed may be mounted to the bearing steel ball 10A.

At the time of the die casting of the holder 2, the casting dies 6A and 6B are opened so that the bearing steel ball 10A having the resin sliding contact member 3 mounted thereto and the pivot shaft 5 are set as the cores. Then, those casting dies are closed so that, as illustrated in FIG. 4, the resin sliding contact member 3, the bearing steel ball 10A, and the pivot shaft 5 are fixed at predetermined positions. Next, in this state, a melt of the aluminum alloy or the zinc alloy is injected into a cavity 7 in the dies under pressure. Note that, reference symbol 6C in FIG. 4 represents a core configured to form a pilot hole for the female threads 21a into the body portion of the holder.

At this time, parts of the spherical surface of the bearing steel ball 10A, which protrude out of the resin sliding contact member 3, are fitted to concave support seats 60 and 61 formed on the casting dies 6A and 6B. Rims of the support seats 60 and 61 are held in contact with rims of the resin sliding contact member 3. With this, the body portion 20 of the holder 2 is cast under a state in which the bearing steel ball 10A is wrapped with the above-mentioned alloy from the outside of the resin sliding contact member 3. The body portion 20 is isolated from the bearing steel ball 10A by the resin sliding contact member 3 so that the bearing steel ball 10A is kept out of contact with the body portion 20. Further, at the time of the casting, an outer peripheral surface of the resin sliding contact member 3 facing the cavity 7 is held in contact with the high-temperature alloy. With this, the resin sliding contact member 3 is firmly fixed to the body portion 20 of the cast holder 2. In this state, a maximum diameter portion of the bearing steel ball 10A is covered with the resin sliding contact member 3. Thus, when the resin sliding contact member 3 is firmly fixed to the body portion 20 of the holder 2, the bearing steel ball 10A is held by the holder 2 so as not to be disengaged therefrom.

Figure 5:
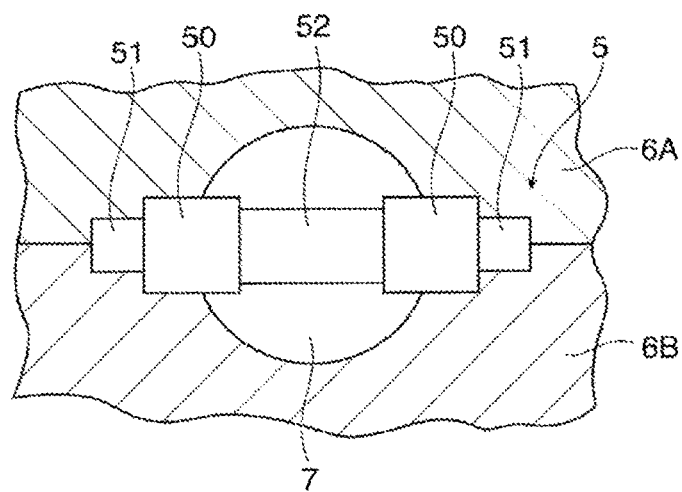
FIG. 5 is a sectional view taken along the line V-V in FIG. 4.

Meanwhile, FIG. 5 is a sectional view taken along the line V-V in FIG. 4. As illustrated in FIG. 5, at the time of casting the holder 2, the pivot shaft 5 is fixed by the casting dies 6A and 6B, and the pivot shaft 5 extends through the cavity 7 that is formed through clamping. In this state, the casting dies 6A and 6B nip parts of the fixing shaft portion 50 and the distal shaft portions 51 of the pivot shaft 5, and parts of the fixing shaft portion 50, which include the engaging groove 52, occupy an inside of the cavity 7. Thus, when the melt of the above-mentioned alloy is injected into the cavity 7 to cast the holder 2, the pivot shaft 5 is embedded into the fixing portion 21 of the holder 2. In this state, both end portions of the pivot shaft 5 covered with the casting dies 6A and 6B, specifically, the parts of the fixing shaft portion 50 and the distal shaft portions 51 protrude out of the cast fixing portion 21. Further, not only the fixing shaft portion 50 of the pivot shaft 5 but also the engaging groove 52 thereof is embedded in the fixing portion 21 of the holder 2, and hence the engaging groove 52 functions as a retainer. With this, the pivot shaft 5 is not pulled out of the holder 2 in the axial direction.

After the holder 2 is cast in this way, the shaft member 11 is welded to the bearing steel ball 10A. As the welding in this case, among various electric resistance welding processes, projection welding can be employed. At the time of the projection welding, an electrode is held in abutment against the bearing steel ball 10A through the opening portion 23 formed in the holder 2, whereas another electrode is similarly held in abutment against the shaft member 11. Welding current is caused to pass through the bearing steel ball 10A and the shaft member 11. With this, the ball stud 1 having the bearing steel ball 10A joined to the distal end of the shaft member 11 as the ball portion 10 is completed.

After that, the female threads 21a are machined into the fixing portion of the holder, the closure cap 24 is mounted to the opening portion 23 of the holder 2, and the boot seal 4 is mounted. Through those sequential steps, the ball joint is completed.

Figure 6:
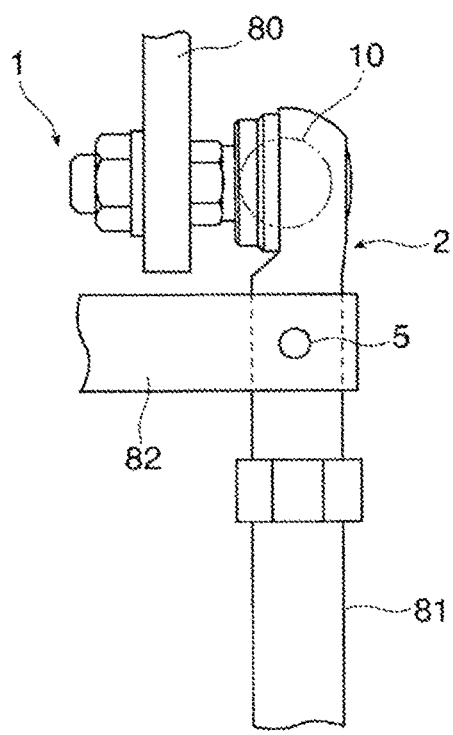
FIG. 6 is a view for illustrating a use example of the ball joint of the present invention.

FIG. 6 is a schematic view for illustrating a use example of the ball joint of the present invention. A first mechanical element 80 is coupled to the ball stud 1, whereas a second mechanical element 81 is coupled to the holder 2. The first mechanical element 80 and the second mechanical element 81 are coupled to each other in a freely pivotable manner with the ball portion 10 of the ball stud 1 defining the pivot center. Further, through intermediation of bearings, a third mechanical element 82 is coupled in a freely pivotable manner to the pivot shaft 5 that is fixed to the holder 2. The pivot shaft 5 defines the second pivot center independently of the ball portion 10.

As described above, according to the ball joint of the present invention, the pivot shaft 5 that defines the second pivot center is integrated with the holder 2. Thus, at the time of assembling a link device, the third mechanical element 82 can be easily added to the first mechanical element 80 and the second mechanical element 81 that are coupled to each other with the ball joint. In addition, the pivot shaft 5 that defines the second pivot center can be arranged near the ball portion 10 that defines the pivot center of the first mechanical element 80 and the second mechanical element 81. With this, a degree of freedom in design of the link device can be increased.

Further, the pivot shaft 5 is integrated with the holder 2 at the time of the casting of the holder 2. Thus, the second pivot center can be added to existing ball joints at low cost. Thus, ball joints applicable to various link devices can be manufactured at low cost.

The invention claimed is:
1. A ball joint, comprising:
   a ball stud comprising:
      a shaft member configured to allow a first mechanical element to be coupled thereto; and
      a ball portion formed at a distal end of the shaft member;
   a holder comprising a fixing portion and a body portion opposite the fixing portion, wherein the holder is configured to allow a second mechanical element to be coupled thereto, the holder being formed through casting with the ball portion being set therein as a core to cover a maximum diameter portion of the ball portion, the holder being configured to couple the first mechanical element and the second mechanical element in a freely pivotable manner via the ball portion about a first pivot center; and a pivot shaft that passes through the fixing portion and comprises opposing end portions that protrude out of opposing sides of the holder in a direction transverse to the shaft member of the ball stud to define a second pivot center independent of the ball portion, and to serve as a coupling portion for a third mechanical element, the pivot shaft being at least partially enclosed within the holder at the time of the casting of the holder.

2. The ball joint according to claim 1, wherein the pivot shaft comprises a columnar shaft member.

3. The ball joint according to claim 2, wherein the pivot shaft has an engaging groove that is formed at a portion of the pivot shaft between the opposing end portions, and is covered by the body portion of the holder.

* * * * *